(12) United States Patent
Bhattacharya et al.

(10) Patent No.: US 6,765,759 B2
(45) Date of Patent: Jul. 20, 2004

(54) RESONANCE FOUR PIECE SUSPENSION

(75) Inventors: Sandeepan Bhattacharya, Bloomington, MN (US); Kevin Jon Schulz, Apple Valley, MN (US); Haiming Zhou, Eden Prairie, MN (US); David G. Qualey, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 177 days.

(21) Appl. No.: 09/812,192

(22) Filed: Mar. 19, 2001

(65) Prior Publication Data

US 2001/0048574 A1 Dec. 6, 2001

Related U.S. Application Data

(60) Provisional application No. 60/207,638, filed on May 25, 2000.

(51) Int. Cl.[7] .............................. G11B 21/16; G11B 5/48
(52) U.S. Cl. .................................. 360/244.2; 360/245.2
(58) Field of Search ........................... 360/244.2, 244.5, 360/244.7, 244.8, 245, 245.2, 244, 240

(56) References Cited

U.S. PATENT DOCUMENTS

| | | | | | |
|---|---|---|---|---|---|
| 5,793,569 | A | * | 8/1998 | Christianson et al. | .... 360/244.3 |
| 6,014,289 | A | * | 1/2000 | Goss | ........................ 360/244.1 |
| 6,057,986 | A | * | 5/2000 | Takasugi | .................. 360/245.9 |
| 6,072,664 | A | * | 6/2000 | Aoyagi et al. | ........... 360/244.5 |
| 6,515,832 | B1 | * | 2/2003 | Girard | ...................... 360/245.3 |
| 2002/0051317 | A1 | * | 5/2002 | Takagi et al. | ............. 360/244.5 |
| 2002/0051322 | A1 | * | 5/2002 | Kashima et al. | .......... 360/245.2 |

* cited by examiner

*Primary Examiner*—Julie Anne Watko

(57) ABSTRACT

A system and a method for increasing suspension resonance frequencies of a head suspension assembly of a disc drive includes, in one example embodiment, attaching a base plate to an actuator arm assembly of the disc drive such that the base plate including the actuator arm assembly are in actuating relationship with a rotating disc of the disc drive. A two-piece suspension member having a first and second pieces is attached to the base plate. A gimbal is attached to the two-piece suspension member such that a predetermined bendable area is formed between the first and second pieces and on the gimbal having a stiffer preload bend radius. A stiffer preload bend radius provides a higher stiffness-to-mass ratio without increasing the spring rate of the head suspension assembly to increase suspension resonance frequencies of the head suspension assembly to fall outside a bandwidth of a servo drive to reduce off-track motion of the head suspension assembly during track follow-and-seek operations of the disc drive.

13 Claims, 4 Drawing Sheets

RESONANCE FOUR PIECE SUSPENSION

RELATED APPLICATION

This application claims the benefit of U.S. Provisional Application Serial No. 60/207,638, filed May 25, 2000 under 35 U.S.C. 119(e).

FIELD OF THE INVENTION

The present invention relates to the field of mass storage devices. More particularly, this invention relates to an improved head suspension assembly of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider that is aerodynamically designed so that it flies over the disc. The slider is passed over the disc in a transducing relationship with the disc. Most sliders have an air-bearing surface (ABS) which includes rails and a cavity between the rails. When the disc rotates (generally, at rotational speeds of 10,000 RPM or higher), air is dragged between the rails and the disc surface causing pressure, which forces the head away from the disc. At the same time, the air rushing past the cavity or depression in the air-bearing surface produces a negative pressure area. The negative pressure or suction counteracts the pressure produced at the rails. The slider is also attached to a load spring, which produces a force on the slider directed toward the disc surface. The various forces on the slider equilibrate, so that the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also required to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of the disc drive. Each track on a disc surface in a disc drive is further divided into a number of short arcs called sectors. Servo feedback information is used to accurately locate the transducer head on to the tracks/sectors. The actuator assembly is moved to the required position and held very accurately during a read or write operation using the servo information.

The actuator assembly is composed of many parts that contribute to the performance required to accurately hold the read/write head in the proper position. There are two general types of actuator assemblies, a linear actuator and a rotary actuator. The rotary actuator includes a pivot assembly, an arm, a voice coil yoke assembly, and a head gimbal suspension assembly. The rotary actuator assembly pivots or rotates to reposition the transducer head over particular tracks on a disk. A suspension or load beam is part of the head gimbal suspension assembly. The rotary actuator assembly also includes a main body, which includes a shaft and bearing about which the rotary actuator assembly pivots. Attached to the main body are one or more arms. One or typically two head gimbal suspension assemblies are attached to the arm. Generally the length of the arm is approximately equal to the length of the suspension. Total length of the arm and the suspension is one of many other factors that can affect mechanical resonance frequencies of the actuator arm assembly.

One end of the suspension is attached to the actuator arm assembly. The transducer head, also known as a read/write head, is found attached to the other end of the suspension. One end of the actuator arm assembly is coupled to a pivot assembly. The pivot assembly, in turn, is connected to a voice coil motor attached to a voice coil yoke on the main body of the actuator assembly. The other end of the actuator arm assembly is attached to the head gimbal suspension assembly. The head gimbal suspension assembly includes a gimbal to allow the read/write head to pitch and roll and follow the topography of the imperfect memory disc surface. The head gimbal assembly also restricts motion with respect to the radial and circumferential directions of the memory disc. The suspension assembly is coupled to the actuator arm assembly as part of the main body of the actuator assembly, which holds the pivot support and is coupled to the voice coil motor.

Actuator arms are cantilevered assemblies, which act as spring-mass-damper systems, and have resonant frequencies that can degrade the performance of the servo system. Every closed loop servo motor system has a predetermined bandwidth in which mechanical resonances occurring within the bandwidth degrade the performance of the servo motor system. The actuator arm is one key source of unwanted mechanical resonances. Accordingly, the bandwidths of most servo motor systems are designed so that resonance of the actuator arm and suspension occur outside the bandwidth. Current actuator arms are made of steel, aluminum or magnesium. Suspensions are typically made of stainless steel.

Increasingly, higher number of bits are being packed into every square inch of the disc surface leading to a higher number of tracks per inch (TPI) or reduced track width. Thus, the head (and thus the suspension) needs to track follow more effectively or have further reduced off-track motion. In order to accomplish this, a higher servo bandwidth is required. To develop servo systems with a higher bandwidth, the suspension resonance frequencies need to be increased (a stiffer suspension is required).

The resonant characteristics of the actuator arm have bending and torsion modes, with frequencies that are within the same frequency range as the suspension and the magnetic storage disc. Great care must be used when designing an actuator system to prevent alignment of resonance modes that would create very high gains and an unstable servo performance. Alignment of resonance modes means, one component resonates at a frequency, which is very near, or the same as the resonant frequency of another component.

Actuator arms and suspensions can be made thicker to increase the bending and torsion mode frequencies, but the greater mass significantly degrades the performance of the actuator assembly by increasing the moment of inertia of the arm. Inertial increase will increase the access time for moving the transducer between data tracks. Yet another problem of increasing the arm and suspension thickness is, it can increase the current requirements necessary to move the voice coil motor. Increased current results in increased heat within the disk enclosure and increased power requirements.

Use of thicker sheet material and a reduced effective bend length for the actuator arm and the suspension can also result in a very high vertical stiffness (spring rate). However, this can result in requiring additional rework in the head stack assembly process to achieve the desired or target gram load. Typically, the suspension assembly has a spring section, which includes a preformed bend or radius. This radius provides the spring or load force and thus a desired load to the head slider for a predetermined offset height, the offset height being a measurement of the distance between the mounting height of the head suspension to the actuator and the head slider at "fly" height. Spring force (is the force the spring region exerts on the head slider toward the disc) is directly proportional to the distance the head slider has been deflected away from the disc. The greater the deflection, the greater the opposing force, and lesser the deflection the lower the opposing force.

As this discussion makes clear, the fly height of the head slider above the disc is a balance of the lifting force and the opposing load force. Thus, the load force is one factor that directly determines the height at which the head moves over the disc. This height is critical to high speed, accurate storage and retrieval of data. Disc drive manufacturing processes can make fly-height control difficult to realize due to handling of suspension after production and manufacturing tolerances within the disc drive manufacture and/or assembly. A tight control of the gram load is required to achieve the appropriate fly height of the head in the drive and reduce the fly-height variation. Prior art reveals a method of reducing spring rate of the suspension by etching out approximately 50–60% of the material in the preformed bend area (load carrying section) of the suspension. Although, this method leads to a reduction in the spring rate, the variation in the remaining material thickness dictated by the etching process can result in a significant variation in the spring rate, the free state angle, and the suspension resonances. In addition, the etching process can generate sharp corners in the preload bend radius which, can in-turn result in regions of stress concentrations. This can in turn, lead to a lower force to yield, making the suspension more prone to gram load loss during assembly process as well as in the drive.

What is needed is an improved head suspension assembly, for a disc drive, that increases stiffness-to-mass ratio without increasing the spring rate of the head suspension assembly so that the suspension resonance frequencies of the head suspension assembly fall outside the bandwidth of the servo drive to reduce off-track motion of the head slider, during track follow-and-seek operations, to meet the industry's ever increasing need to store higher number of bits for every square inch of a disc surface of the disc drive.

SUMMARY OF THE INVENTION

A disc drive includes a base and a disc rotatably attached to the base. The disc drive also includes an actuator arm assembly attached to the base such that the actuator arm assembly is in an actuating relationship with respect to the base and the rotating disc. A servo drive controls the movement of the actuator arm assembly during track follow-and-seek operations of the disc drive. An improved head suspension assembly having a higher stiffness-to-mass ratio to increase suspension resonance frequencies to fall outside a bandwidth of the servo drive without increasing spring rate of the head suspension assembly is attached to the actuator arm assembly to reduce off-track motion of a transducer head/slider during the track follow-and-seek operations of the disc drive. The improved head suspension assembly includes a base plate, a two-piece suspension member, and a gimbal. The two-piece suspension member includes a first and second pieces. The base plate is attached to the actuator arm assembly. The first piece of the two-piece suspension member is attached to the base plate such that the two-piece suspension member, the base plate, and the actuator arm assembly are all in an actuating relationship with respect to the rotating disc. Next, the gimbal is attached to the first and second pieces of the two-piece suspension member such that a predetermined bendable area having stiffer preload bend radius is formed between the first and second pieces. The stiffer preload bend radius in the gimbal provides a higher stiffness-to-mass ratio to increase suspension resonance frequencies such that the suspension resonance frequencies fall outside a bandwidth of the servo drive without increasing the spring rate of the suspension assembly.

Also, discussed is a method of increasing suspension resonance frequencies without increasing spring rate of the head suspension assembly of a disc drive. The method begins with the step of attaching a base plate to an actuator arm assembly of the disc drive. Next, the method includes attaching the base plate to a two-piece suspension member having first and second pieces such that the base plate including the two-piece suspension member are in an actuating relationship with respect to a rotating disc of the disc drive. Then, the method includes attaching a gimbal to the two-piece suspension member such that the gimbal has a predetermined bendable area having stiffer preload bend radius between the first and second pieces. The stiffer preload bend radius provides a higher stiffness-to-mass ratio to the head suspension assembly to increase suspension resonance frequencies such that the suspension resonance frequencies fall outside a bandwidth of a servo drive to reduce off-track motion during track follow-and-seek operations of the disc drive.

Advantageously, the method and the apparatus described above increase the stiffness-to-mass ratio to increase the suspension resonance frequencies of the head suspension assembly such that the suspension resonance frequencies fall outside the bandwidth of the servo drive to reduce off-track motion of transducer heads/sliders during track follow-and-seek operations. This is accomplished without increasing the spring rate of the head suspension assembly. As a result, the disc drive can achieve an improved resonance performance, a higher servo bandwidth, and thus a better track following capability. This can result in having higher track densities, and increased storage capability in the disc drive.

DESCRIPTION OF THE PREFERRED EMBODIMENT

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable.

Figure 1:
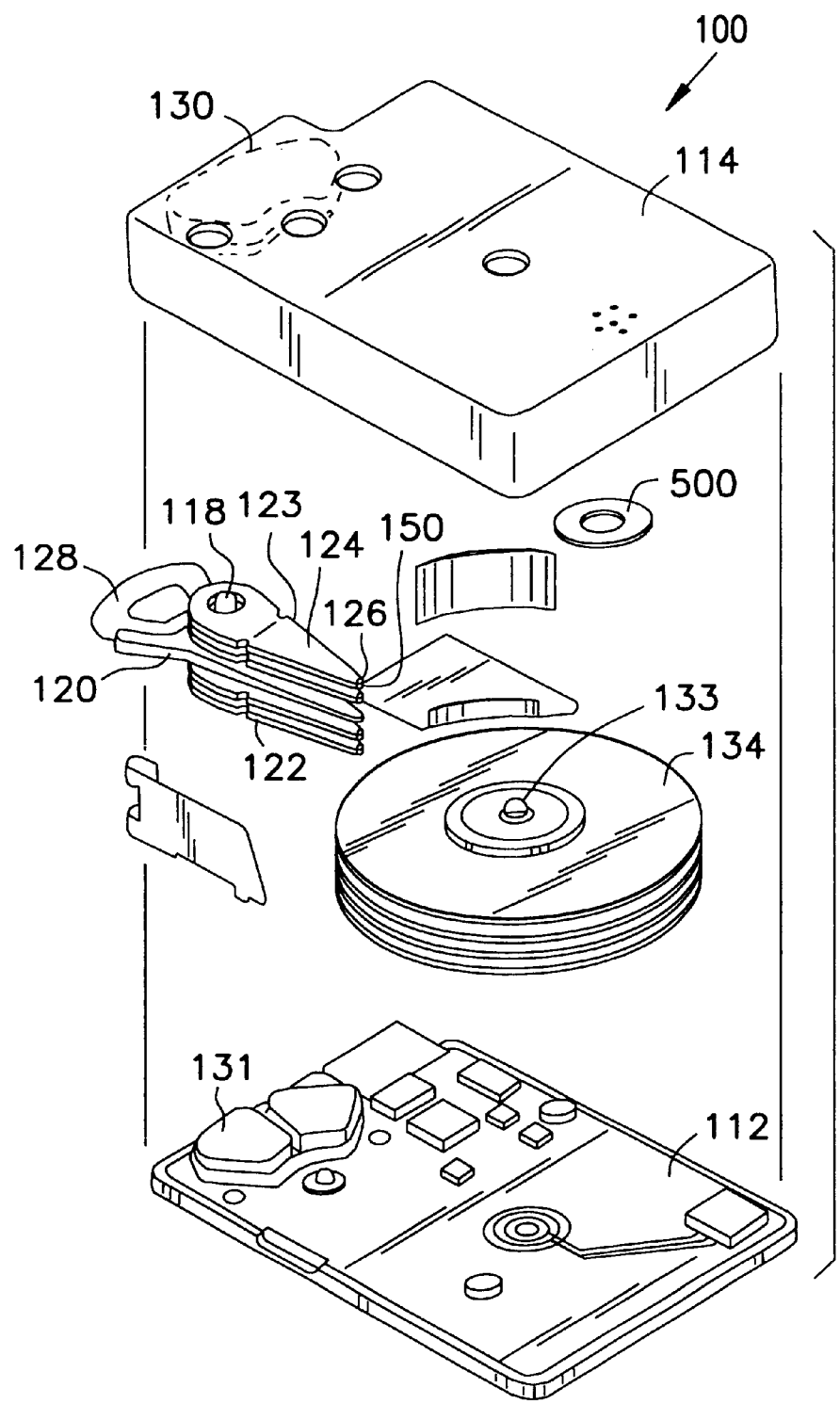
FIG. 1 is an exploded view of a disc drive with a multiple disc stack.

FIG. 1 is an exploded view of one type of a disc drive 100 having a rotary actuator. The disc drive 100 includes a housing or a base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126, which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor, which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a recording surface 135. Only one disc 134 is numbered for the sake of clarity. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors, which are within the hub 133 or under the hub. The disc drive also includes a printed circuit card 170, which is attached to the base 112 of the disc drive 100. The printed circuit card 170 includes a controller 180 and random access memory 182, which the controlled accesses to control various aspects of the disc drive. The aspect of the disc drive controlled of interest is the control of the interface between a host computer and the disc drive and more specifically, the control of mapping logical block addresses to physical sector locations on a particular disc 134.

Figure 2:
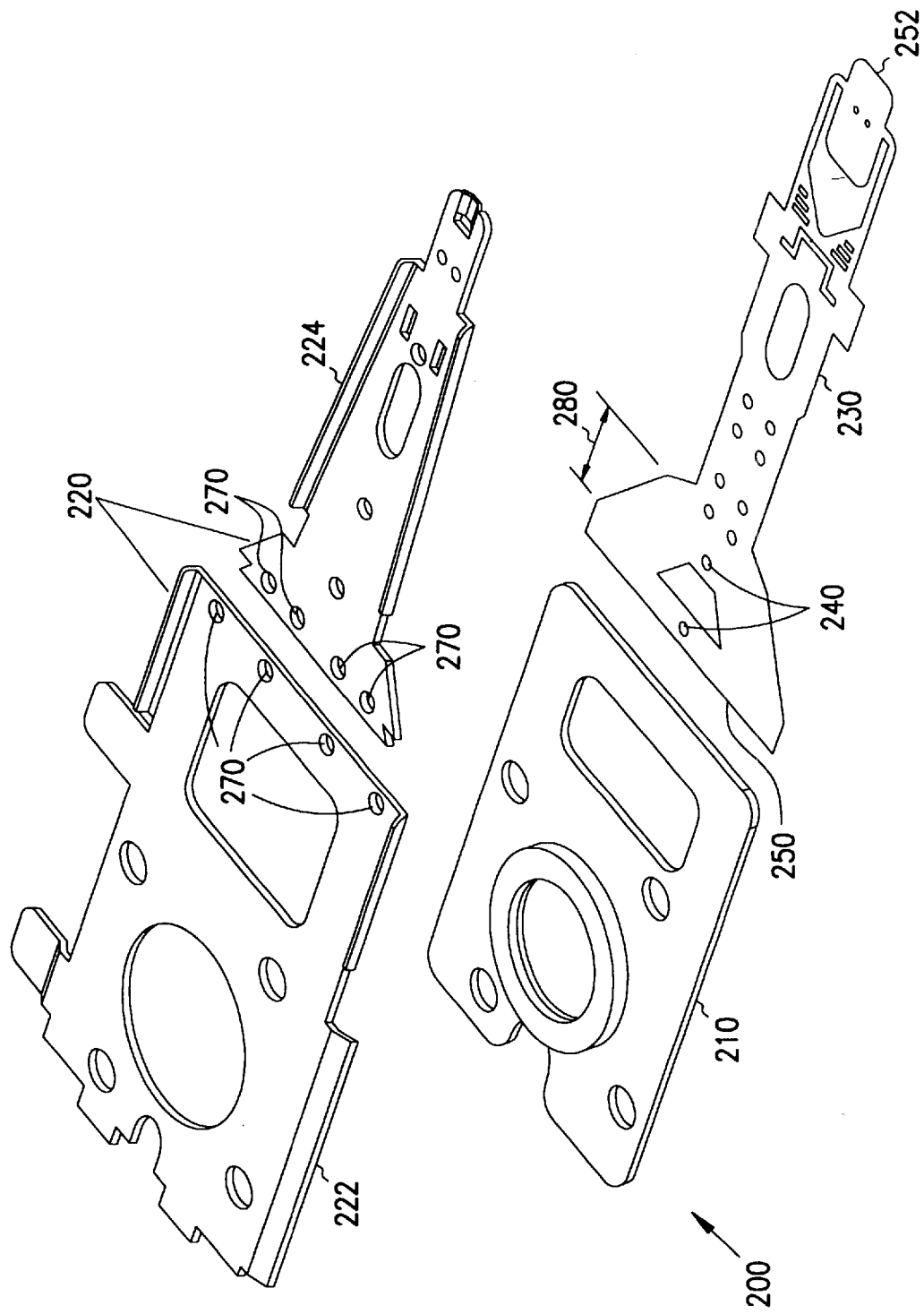
FIG. 2 is an exploded view of an improved head suspension assembly according to the teachings of the present invention.

Referring now to FIG. 2, there is shown an exploded view of an improved head suspension assembly 200 according to the teachings of the present invention. The head suspension assembly 200 is formed using a four-piece assembly. The four-piece assembly includes a base plate 210, a two-piece suspension member 220, and a gimbal 230. The head suspension assembly 200 is coupled to the actuator arm assembly 120 of the disc drive 100. The head suspension assembly and the actuator arm assembly 120 are in actuating relationship with respect to the rotating disc 134 of the disc drive 100. In some embodiments the actuator arm assembly 120 can include one or more actuator arms, and each of the one or more actuator arms can include the improved head suspension assembly 200.

The two-piece suspension member 220 includes a first piece 222 and second piece 224. The first piece 222 of the two-piece suspension member 220 is attached to the base plate 210 such that the base plate 210, including the two-piece suspension member 220, are in an actuating relationship with respect to the rotating disc 134.

The gimbal 230 has a first end 250 and a second end 252. The first end 250 of the gimbal 230 is attached to the first and second pieces 222 and 224 of the two-piece suspension member 220 such that a predetermined bendable area 280 is formed on the gimbal 230. The predetermined bendable area is formed between the first and second pieces 222 and 224 of the two-piece suspension member 220. The second end 252 of the gimbal 230 is attached to the transducer head 150 and the slider 126. The first end 250 of the gimbal 230 is attached to the two-piece suspension member 220 such that the predetermined bendable area 280 has a higher stiffness-to-mass ratio to increase suspension resonance frequencies of the head suspension assembly such that the suspension resonance frequencies falls outside a bandwidth of a servo drive without increasing the spring rate of the head suspension assembly. The off-track motion of the transducer head 150 and slider 126 during track follow-and-seek operations of the disc drive 100 can be significantly reduced by increasing the suspension resonance frequencies of the head suspension assembly 200. In some embodiments, the gimbal 230 is welded on to the two-piece suspension member 220 at locations 270 shown in FIG. 2 to increase the stiffness-to-mass ratio.

In some embodiments, the gimbal 230 is further attached to the first and second pieces 222 and 224 using an adhesive to provide a stiffer preload bend radius in the predetermined bendable area 280. The stiffer preload bend radius further increases the stiffness-to-mass ratio of the head suspension assembly to increase torsional and lateral resonance frequencies of the suspension assembly so that the transducer head 150 and the slider 126 has reduced off-track motion during the track follow-and-seek operations. The adhesive is disposed through access holes 240 located on the gimbal 230 to further attach the gimbal 230 to the two-piece suspension member 220. In some embodiments, the adhesive used to attach the gimbal 230 to the two-piece suspension member 220 is a low-viscosity adhesive capable of bonding the gimbal to the first and second pieces 222 and 224 such that the torsional and lateral frequencies are increased to fall outside the bandwidth of the servo drive. The adhesive used can be EMCAST 712-5k or other similar adhesives. In some embodiments, the base plate, the two-piece suspension member, and the gimbal are all made from a sheet of stainless steel material. The thickness of the two-piece suspension member can be in the range of about 0.002" to 0.004". The thickness of gimbal can be in the range of about 0.00086" to 0.001". The thickness of the base plate can be in the range of about 0.0059" to 0.008".

Figure 3:
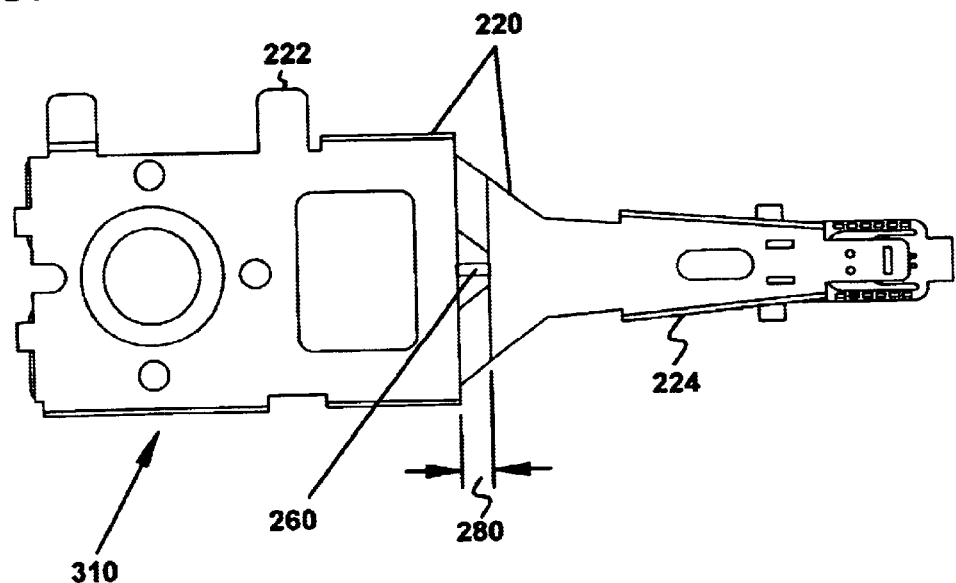
FIGS. 3 and 4 are top and bottom views respectively, of the head suspension assembly shown in FIG. 2.
Figure 4:
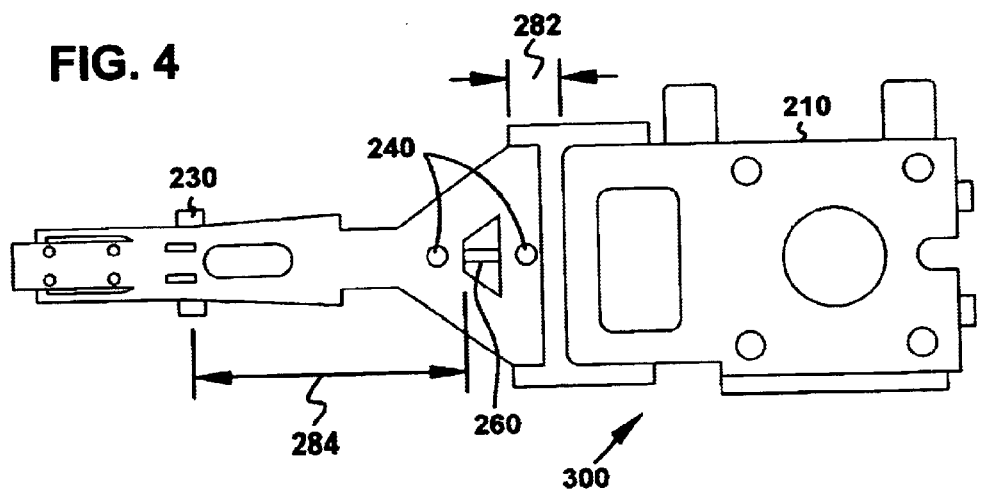

Referring now to FIGS. 3 and 4, there is shown top and bottom views 310 and 300 respectively, of the head suspension assembly 200 shown in FIG. 2. The top and bottom views 310 and 300 in FIGS. 3 and 4 shows the head suspension assembly 200 in a fully assembled state including the two-piece suspension member 220, the base plate 210, and the gimbal 230. Also, shown in the top view 310 is the predetermined bendable area 280 formed on the gimbal 230 after attaching the first and second pieces 222 and 224 to the gimbal 230. It can also be seen that the predetermined bendable area 280 is between the first and second pieces 222 and 224. Also, shown are the access holes 240 to dispense the adhesive to further attach the gimbal 230 to the two-piece suspension member 220. The addition of adhesive to the edge regions 282 and 284 increases the resonance performance of the head suspension assembly 200. The adhesive dispensed through the access holes 240 wicks through gaps generated between the two-piece suspension member 220 and the gimbal 230 due to the distortion of the sheet material during the welding of the gimbal 230 to the two-piece suspension member. The gaps generated between the two-piece suspension member 220 and the gimbal 230 is generally sufficient for the dispensed adhesive to wick through the gaps and completely bond the two-piece suspension member 220 to the gimbal 230 around the edge regions 282 and 284.

It can be seen from the following table that the improved head suspension assembly 200 of the present invention has significantly increased resonance frequencies over the prior-art head suspension assembly without increasing the spring rate of the head suspension assembly.

| Type of Resonance Frequency | Prior-art Suspension Assembly (Spring rate 50.92 gmf/in) | Improved Suspension Assembly of the present invention (Spring rate 33.20 gmf/in) |
| --- | --- | --- |
| $1^{st}$ Bending | 2.47 kHz | 3.57 kHz |
| $1^{st}$ Torsion | 4.15 kHz | 7.35 kHz |
| $2^{nd}$ Bending | 6.91 kHz | 8.88 kHz |
| $2^{nd}$ Torsion | 11.03 kHz | 19.30 kHz |
| Lateral | 13.70 kHz | 13.32 kHz |

Figure 5:
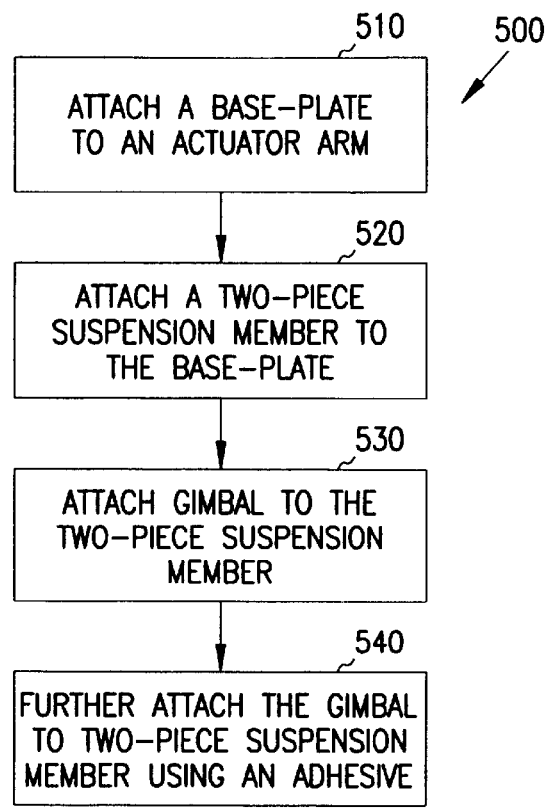
FIG. 5 is a flow diagram of a method for increasing suspension resonance frequencies without increasing the spring rate of the head suspension assembly shown in FIG. 2.

FIG. 5 illustrates a method of increasing suspension resonance frequencies without increasing spring rate of a head suspension assembly according to the teachings of the present invention. In this example embodiment shown in FIG. 5, the method 500 begins with the step 510 of attaching a base plate to an actuator arm assembly such that the base plate including the actuator arm assembly are in an actuating relationship with respect to a rotating disc of a disc drive.

Step 520 includes attaching a two-piece suspension member to the base plate such that the two-piece suspension is also in actuating relationship with respect to the rotating disc. In some embodiments, the two-piece suspension member includes a first and second pieces. In these embodiments, the first piece is attached to the base plate.

Step 530 includes attaching a gimbal to the first and second pieces of the two-piece suspension member such that the gimbal has a predetermined bendable area between the first and second pieces of the two-piece suspension member. The gimbal is attached to the first and second pieces such that the predetermined bendable area has a higher stiffness-to-mass ratio without increasing spring rate of the head suspension assembly. The higher stiffness-to-mass ratio increases suspension resonance frequencies of the head suspension assembly, such that the suspension resonance frequencies fall outside a bandwidth of a servo drive to reduce off-track motion of a transducer head/slider mounted on to the head suspension assembly during track follow-and-seek operations of the disc drive.

In some embodiments, the base plate, the two-piece suspension member, and the gimbal are all made from a sheet of stainless steel material. In these embodiments, the two-piece suspension member is attached to the gimbal by welding the two-piece suspension member to the gimbal.

Method 500 can include step 540. Step 540 includes further attaching the gimbal to the two-piece suspension member by disposing an adhesive between the two-piece suspension member and the gimbal. The disposing of the adhesive between the two-piece suspension member and the gimbal further stiffens the predetermined bendable area and provides a stiffer preload bend radius in the predetermined bendable area. The stiffer preload bend radius increases torsional and lateral resonance frequencies of the head suspension assembly to improve track following during the track follow-and-seek operations of the disc drive. The adhesive is disposed through access holes provided in the gimbal. In one embodiment, the adhesive is a low-viscosity adhesive capable of flowing between gaps of welded two-piece suspension member and the gimbal. The gaps are formed due to distortion of the sheet material during the welding of the two-piece suspension member and the gimbal. Further, the low-viscosity adhesive is capable of bonding the gimbal to the first and second pieces such that the torsional and lateral resonance frequencies are increased to fall outside the bandwidth of the servo drive. The adhesive can be EMCAST 712-5k or other such adhesives.

Figure 6:
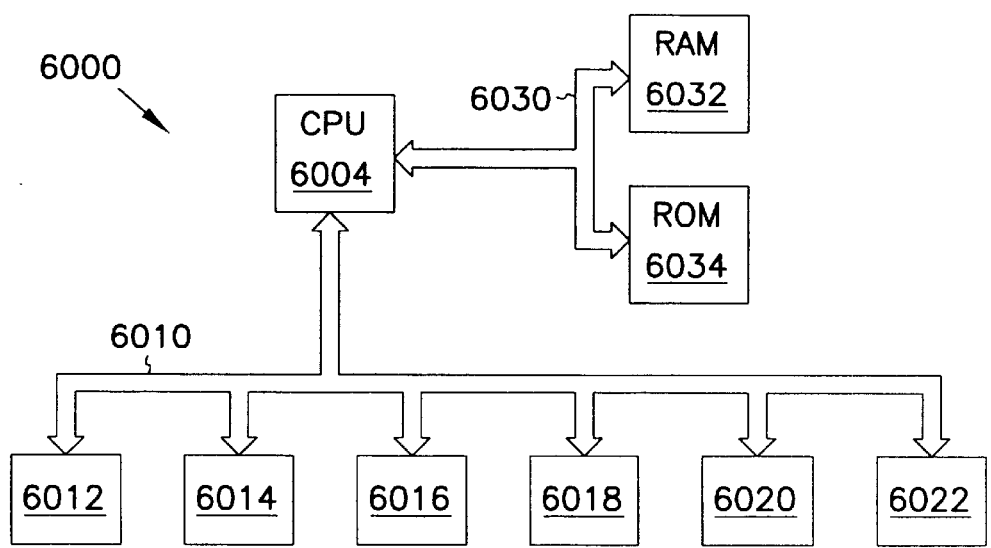
FIG. 6 is a schematic view of a computer system.

FIG. 6 is a schematic view of a computer system. Advantageously, the invention is well suited for use in a computer system 600. The computer system 600 may also be called an electronic system or an information handling system and includes a central processing unit, a memory and a system bus. The information handling system includes a central processing unit 604, a random access memory 632, and a system bus 630 for communicatively coupling the central processing unit 504 and the random access memory 632. The information handling system 602 may also include an input/output bus 610 and several peripheral devices, such as 612, 614, 616, 618, 620, and 622 may be attached to the input output bus 610. Peripheral devices may include hard disc drives, magneto-optical drives, floppy disc drives, monitors, keyboards and other such peripherals. Any type of disc drive may include an improved head suspension assembly as described above.

Conclusion

In conclusion, a disc drive 100 includes a base 112 and a disc 134 rotatably attached to the base 112. The disc drive 100 also includes an actuator arm assembly 120 attached to the base 112 such that the actuator arm assembly 120 is in an actuating relationship with respect to the base 112 and the rotating disc 134. A servo drive controls the movement of the actuator arm assembly 120 during track follow-and-seek operations of the disc drive 100. An improved head suspension assembly 200 having a higher stiffness-to-mass ratio to increase suspension resonance frequencies to fall outside a bandwidth of the servo drive without increasing spring rate of the head suspension assembly is attached to the actuator arm assembly 120 to reduce off-track motion of a transducer head/slider 150/126 during the track follow-and-seek operations of the disc drive. The improved head suspension assembly 200 includes a base plate 210, a two-piece suspension member 220, and a gimbal 230. The two-piece suspension member 220 includes a first and second pieces 222 and 224. The base plate 210 is attached to the actuator arm assembly 120. The first piece 222 of the two-piece suspension member 220 is attached to the base plate 210 such that the two-piece suspension member 220, the base plate 210, and the actuator arm assembly 120 are all in an actuating relationship with respect to the rotating disc 134. Next, the gimbal 230 is attached to the first and second pieces 222 and 224 of the two-piece suspension member 220 such that a predetermined bendable area 280 having a stiffer preload bend radius is formed between the first and second pieces. The stiffer preload bend radius in the gimbal provides a higher stiffness-to-mass ratio to increase suspension resonance frequencies such that the suspension resonance frequencies fall outside a bandwidth of the servo drive without increasing the spring rate of the head suspension assembly 200. In some embodiments, the first and second pieces 222 and 224 are further attached to the gimbal 230 by disposing an adhesive between the first and second pieces 222 and 224 of the two-piece suspension member 220 and the gimbal 230 to further stiffen the preload bend radius and to increase torsional and lateral resonance frequencies of the head suspension assembly 200. Increasing the stiffness-to-mass ratio of the head suspension assembly 200 without increasing the spring rate of the head suspension assembly reduces off-track motion of the transducer heads/sliders during track follow-and-seek operations of the disc drive 100.

Also, discussed is a method 500 of increasing suspension resonance frequencies without increasing spring rate of the head suspension assembly of a disc drive. The method 500 begins with the step 510 of attaching a base plate to an actuator arm assembly of the disc drive. Next, the method 500 includes step 520 of attaching the base plate to a two-piece suspension member having first and second pieces such that the base plate including the two-piece suspension member are in an actuating relationship with respect to a rotating disc of the disc drive. Then, the method 500 includes step 530 of attaching a gimbal to the two-piece suspension member such that the gimbal has a predetermined bendable area having stiffer preload bend radius between the first and second pieces. The stiffer preload bend radius provides a higher stiffness-to-mass ratio to the head suspension assembly to increase suspension resonance frequencies such that the suspension resonance frequencies fall outside a bandwidth of a servo drive to reduce off-rack motion during track follow-and-seek operations of the disc drive. Next, the method 500 can include step 540 of further attaching the gimbal to the two-piece suspension member by disposing an adhesive between the first and second pieces of the two-piece suspension member and the gimbal to further stiffen the preload bend radius and to increase torsional and lateral resonance frequencies of the head suspension assembly.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A head suspension assembly comprising:
    a base plate;
    a two-piece suspension member, having a first piece and a second piece, wherein the first piece is attached to the base plate; and
    a gimbal, wherein the gimbal is attached to the first piece and the second piece, further wherein the first and second piece are attached to the gimbal a distance from each other, the distance defining a predetermined bendable area on the gimbal, said gimbal is attached to the two-piece suspension by an adhesive.

2. The assembly of claim 1, further comprising:
    a central detab connected between the first and second piece.

3. The assembly of claim 2, further comprising:
    a plurality of openings defined in the first and second pieces, wherein the adhesive is positioned within said openings so that the adhesive is in contact with the both the first and second pieces and the gimbal.

4. The assembly of claim 3, wherein the adhesive comprises: a low-viscosity adhesive capable of bonding the gimbal to the first and second pieces such that the torsional and lateral resonance frequencies are increased to fall outside the bandwidth of the servo drive.

5. The assembly of claim 1, wherein the first and second pieces have first and second ends, respectively, further the gimbal also has first and second ends, wherein the first end of the first piece is attached to the base plate, the second end of the first piece is attached to the first end of the gimbal, wherein the first end of the second piece is attached to the second end of the gimbal such that a predetermined bendable area is formed in the gimbal between the second end of the first piece and the first end of the second piece.

6. The assembly of claim 1, wherein the bass plate, the two-piece suspension member; and the gimbal comprises stainless steel material.

7. The assembly of claim 6, wherein the two-piece suspension member has a thickness in the range of 0.002" to 0.004".

8. The assembly of claim 6, wherein the gimbal has a thickness in the range of 0.00086" to 0.001".

9. The assembly of claim 6, wherein the base plate has a thickness in the range of 0.0059" to 0.008".

10. A head suspension assembly comprising:
    a base plate;
    a two-piece suspension member, having a first piece and a second piece, wherein the first piece is attached to the base plate;
    a gimbal, wherein the first and second piece are attached to the gimbal, the first piece is a distance from the second piece, further wherein the distance defines a predetermined bendable area on the gimbal; and
    an adhesive, wherein the adhesive is positioned between the gimbal and the attached portions of the first and second pieces of the two-piece suspension member.

11. The head suspension assembly of claim 10, wherein the base plate, the two-piece suspension member; and the gimbal comprises stainless steel material.

12. The head suspension assembly of claim 11, wherein the adhesive comprises a low-viscosity adhesive capable of bonding the gimbal to the first and second pieces such that the torsional and lateral resonance frequencies are increased to fall outside the bandwidth of the servo drive.

13. The head suspension assembly of claim 10, wherein the base plate, the two-piece suspension member, and the gimbal are made from a sheet of stainless steel material.

* * * * *

UNITED STATES PATENT AND TRADEMARK OFFICE
CERTIFICATE OF CORRECTION

PATENT NO. : 6,765,759 B2
APPLICATION NO. : 09/812192
DATED : July 20, 2004
INVENTOR(S) : Bhattacharya et al.

It is certified that error appears in the above-identified patent and that said Letters Patent is hereby corrected as shown below:

In Column 10, line 1, please make the following change:

--able area on the gimbal, <u>wherein</u> said gimbal...--

In Column 10, line 25, please make the following change:

--wherein the ~~bass~~ <u>base</u> plate, the..."

Signed and Sealed this

First Day of May, 2007

JON W. DUDAS
*Director of the United States Patent and Trademark Office*